(12) United States Patent
Kimura et al.

(10) Patent No.: US 9,110,458 B2
(45) Date of Patent: Aug. 18, 2015

(54) POSITIONING CONTROL APPARATUS AND MACHINE TOOL PROVIDED THEREWITH

(75) Inventors: Akira Kimura, Nara (JP); Koji Yamamoto, Nara (JP); Katsuhiko Ono, Nara (JP); Kimiyuki Nishimura, Nara (JP); Kenichiro Ueno, Nara (JP); Keiichi Nakamachi, Nara (JP)

(73) Assignee: DMG Mori Seiki Co., Ltd., Nara (JP)

( * ) Notice: Subject to any disclaimer, the term of this patent is extended or adjusted under 35 U.S.C. 154(b) by 681 days.

(21) Appl. No.: 13/349,783

(22) Filed: Jan. 13, 2012

(65) Prior Publication Data

US 2012/0296449 A1  Nov. 22, 2012

(30) Foreign Application Priority Data

May 19, 2011 (JP) .................................. 2011-112121
Nov. 1, 2011 (JP) .................................. 2011-240032

(51) Int. Cl.
*G05B 19/19* (2006.01)
*G05D 3/10* (2006.01)
*G05B 19/404* (2006.01)

(52) U.S. Cl.
CPC .... *G05B 19/404* (2013.01); *G05B 2219/41056* (2013.01)

(58) Field of Classification Search
CPC ........ B24B 49/14; B24B 13/06; B24B 37/04; B24B 41/06; B24B 47/22
USPC ......................................................... 700/57
See application file for complete search history.

(56) References Cited

U.S. PATENT DOCUMENTS

| | | | | |
|---|---|---|---|---|
| 4,131,838 A | * | 12/1978 | Etoh et al. ..................... | 318/603 |
| 5,523,953 A | * | 6/1996 | Araie et al. .................... | 700/193 |
| 2003/0114954 A1 | * | 6/2003 | Inagaki et al. ................ | 700/193 |
| 2010/0109594 A1 | | 5/2010 | Miyaji | |

FOREIGN PATENT DOCUMENTS

| | | |
|---|---|---|
| DE | 102009044366 A1 | 5/2010 |
| EP | 0584598 A2 | 8/1993 |
| EP | 1505463 A2 | 7/2004 |
| EP | 1669829 A2 | 11/2005 |
| JP | 2005-056254 | 3/2005 |

OTHER PUBLICATIONS

European Search Report for related application No. 12153236.0-1807, report dated Mar. 12, 2014.

\* cited by examiner

*Primary Examiner* — Mohammad Ali
*Assistant Examiner* — John Park
(74) *Attorney, Agent, or Firm* — Miller, Matthias & Hull LLP

(57) ABSTRACT

A positioning control apparatus has a moving body, a feed device having a guide mechanism for guiding the moving body in the direction of its feed axis and a drive mechanism for moving the moving body, a structural body supporting the feed device and a controller for controlling a moving position of the moving body with respect to a reference position on a machine tool by controlling the operation of the drive mechanism, and further has a calculating section calculating displacement of the feed device in the feed-axis direction with respect to the reference position caused by displacement of the structural body and a compensating section receiving the displacement data measured by the calculating section and adding modification data for eliminating the displacement to a control signal in the controller.

2 Claims, 9 Drawing Sheets

POSITIONING CONTROL APPARATUS AND MACHINE TOOL PROVIDED THEREWITH

TECHNICAL FIELD

This disclosure relates to a positioning control apparatus controlling a feed device for moving a moving body, and a machine tool provided therewith.

BACKGROUND ART

Conventionally, a positioning control apparatus controlling a feed device is mounted on a device in which a highly accurate positioning control is required, such as a machine tool and a mounter. A common feed device on a machine tool is configured with a guide mechanism for guiding a moving body and a drive mechanism for moving the moving body, and the operation of the drive mechanism is controlled by a positioning control apparatus.

As for the guide mechanism, there can be mentioned, for example, a configuration comprising a slide guide mechanism or a rolling guide mechanism, and as for the drive mechanism, there can be mentioned, for example, a configuration comprising a ball screw, a nut which is screwed onto the ball screw and is fixed on the moving body and a drive motor for rotating the ball screw about its axis to move the moving body in the axial direction of the ball screw.

The positioning control apparatus generates a control signal on the basis of a target moving position of the moving body, and transmits a drive current based on the generated control signal to the drive motor to thereby drive the drive motor. Thereby, the ball screw is rotated about its axis and the moving body is moved to the target moving position.

On such a positioning control apparatus, conventionally, in order to compensate for a tracking error generated between a target moving position and an actual moving position of the moving body, the so-called feedback control is generally used in which the rotational speed of the drive motor, the rotational position of the drive motor, an actual current transmitted to the drive motor and so on are monitored and controlled. As a positioning control apparatus performing a high degree of feedback control, a position controller as disclosed in the Japanese Patent No. 4014162 has been suggested.

This position controller is configured to perform a common feedback control on the basis of the rotational position and the rotational speed of the drive motor and feed back to the control signal an integrated feedback value based on a function which four kinds of information, namely the speed of the moving body, the position of the moving body, the rotational speed of the drive motor and the rotational position of the drive motor, concern, thereby compensating for a tracking error generated in the feed drive system.

SUMMARY OF DISCLOSURE

By the way, for achieving a highly accurate machining in a machine tool, the moving body may be positioned accurately with respect to a reference position defined outside the feed device (for example, in a case where a tool is attached to the moving body and a workpiece is mounted to an appropriate structural body, the position of the workpiece).

However, in the above-described conventional positioning control apparatus, including the controller disclosed in the Japanese Patent No. 4014162, the structural body supporting the feed device (for example, a bed or a frame) is considered a perfectly rigid body having an infinite strength in the inertial space and only a tracking error generated in the feed device is compensated for on the assumption that the structural body is never deformed.

In actual fact, perfectly rigid bodies cannot exist and the structural body is certainly deformed (displaced) due to a reaction force caused by acceleration/deceleration for moving the moving body. This deformation causes an error in the trajectory of the tool machining the workpiece. There is no problem when the deformation is so small that the value of the error is greatly below a desired positioning accuracy (for example, positioning accuracy of a few μm), whereas, when the deformation is so large that the value of the error is above the desired positioning accuracy, even if the positioning accuracy of the feed device itself is improved, the positioning accuracy of the moving body with respect to a reference position as described above is unsatisfying and it is not possible to perform a highly accurate machining.

Therefore, the volume of the deformation will be considered below.

In FIG. 9, a mechanism comprising a moving body 50, a feed device 51 for moving the moving body 50, and a structural body 60 supporting the feed device 51 is shown as a physical model. It is noted that, in the figure, the reference numeral 52 indicates a drive motor and the reference numeral 53 indicates a ball screw which is directly connected to an output shaft of the drive motor 52. Further, the structural body 60 may be placed on a ground 65 and the moving body 50 may be positioned with respect to the ground 65.

Further, in this physical model, since the structural body 60 is not a perfectly rigid body, the structural body 60 is approximated as a structure in which the structural body 60 is connected to the ground 65 through a spring (constant $K_2$) and a damper (constant $C_2$). The moving body 50 and the structural body 60 are connected to each other through the ball screw. Since the ball screw is also not a rigid body, the ball screw is approximated to one equipped with a spring (constant $K_1$) and a damper (constant $C_1$) therein, and the moving body 50 can thereby be approximated to one connected to the structural body 60 through a spring (constant $K_1$) and a damper (constant $C_1$).

Thus, in this physical model, where the mass of the moving body 50, the mass of the structural body 60 (the equivalent mass of the structural body 60 contributing to the actual oscillatory deformation thereof), the static displacement of the moving body 50, the acceleration of the moving body 50 and the static displacement of the structural body 60 are represented by $M_1$, $M_2$, $x_1$, $x_1''$ and $x_2$, respectively, the following equations 1 and 2 are derived according to the balance of force F. $K_2$ in the equations 1 and 2 represents the elastic coefficient. It is noted that, since the influence of the constant $C_2$ on the maximum displacement is actually not so large, it is omitted for simplification. Further, the deformation of the ball screw is also omitted because it is compensated for by a conventional full-closed feedback control which is performed by attaching a linear scale or the like on the structural body ($x_1''$ represents the second order differential of the displacement $x_1$ with respect to time).

$$F = M_1 \times x_1'' = K_2 \times x_2 \qquad \text{(Equation 1)}$$

$$x_2 = F/K_2 \qquad \text{(Equation 2)}$$

Further, the natural angular frequency ω of this physical model can be represented by the following equation 3.

$$\omega = (K_2/M)^{1/2} \quad \text{(Equation 3)}$$

wherein $$M = M_1 + M_2$$

The following equation 4 is obtained by the transformation of the equation 3.

$$K_2 = \omega^2 \times M \quad \text{(Equation 4)}$$

Thus, the displacement $x_2$ of the structural body 60 is calculated by the equations 2 to 4 and the following equation 5.

$$x_2 = F/(\omega^2 \times M) \quad \text{(Equation 5)}$$

In this connection, assuming that $M_1 = M_2$, where $f_c = 50$ Hz ($\omega = 2\pi f_c$) from the general natural frequency and $x_1'' = 4$ m/sec² from the acceleration performance of the drive motor 52 on a common machine tool, the displacement $x_2$ of the structural body 60 at a time of acceleration is $x_2 = 4/[(2\pi \times 50)^2 \times 2] \approx 20 \times 10^{-6}$ m = 20 μm from the above equation 5.

Thus, the displacement $x_2$ of the structural body 60 accompanying the movement of the moving body 50 is so large that it is greatly above a positioning accuracy which is required in recent years (for example, positioning accuracy of a few μm). Therefore, no matter how the positioning accuracy of the feed device itself is improved as performed conventionally, since the positioning accuracy of the whole machine tool, that is, the positioning accuracy of the moving body with respect to the reference position is affected by an error due to the deformation of the structural body, it is not possible to avoid a poor positioning accuracy.

For this reason, conventionally, in order to suppress the deformation volume which is represented by the equation 5, the limitation of the acceleration for moving the moving body and the improvement of the rigidity of the structural body have been performed. However, these necessarily make the machining speed of the machine tool lower and make the machine tool itself heavy and large, and therefore the improvement of these points has been desired.

The subject matter disclosed herein was developed in view of the above-described circumstances and an object thereof is to provide a positioning control apparatus capable of improving the positioning accuracy of a moving body with respect to a reference position without impairing the acceleration performance of a feed device for driving the moving body, and a machine tool in which a more highly accurate machining can be achieved by the provision of the positioning control apparatus.

The subject matter claimed herein solves the above-described problem by providing a positioning control apparatus comprising:

a moving body;
a feed device having a guide mechanism for guiding the moving body in a predetermined feed-axis direction and a drive mechanism for moving the moving body;
a structural body supporting the feed device; and
a controller for controlling a moving position of the moving body with respect to a predetermined reference position by controlling the operation of the drive mechanism;
wherein the positioning control apparatus has:
a calculating section which calculates displacement of the feed device in the feed-axis direction with respect to the reference position caused by displacement of the structural body, and
a compensating section which receives the displacement data calculated by the calculating section and adds modification data for eliminating the displacement of the feed device in the feed-axis direction with respect to the reference position to a control signal for controlling the drive mechanism in the controller.

According to this positioning control apparatus, when the moving body is moved along the guide mechanism by the drive mechanism, displacement of the feed device in the feed-axis direction with respect to the reference position, which is caused by displacement of the structural body, is calculated by the calculating section and modification data for eliminating the displacement based on the calculated displacement data is added to the control signal by the compensating section.

The control signal therefore becomes a control signal in which the displacement of the structural body is compensated for and the operation of the drive mechanism is controlled according to this control signal. Therefore, as compared with a conventional positioning control apparatus in which the displacement of the structural body is not compensated for, it is possible to more accurately control a moving position of the moving body.

Further, the compensation of the displacement of the structural body makes it unnecessary to perform control for, when moving the moving body, suppressing the acceleration to thereby suppress deformation (vibration) of the structural body. Therefore, it is possible to achieve motion control in which the acceleration performance of the feed device is made the most of and to shorten the time to move the moving body.

In the above-described configuration, the calculating section may directly or indirectly measure the displacement of the feed device in the feed-axis direction with respect to the reference position caused by the displacement of the structural body and outputs the measured displacement at predetermined time intervals.

According to the above-described configuration, the displacement of the feed device in the feed-axis direction with respect to the reference position caused by the displacement of the structural body is measured and the displacement is calculated on the basis of the result of the measurement. The calculated displacement is transmitted to the compensating section at predetermined time intervals. Thereby, the displacement of the structural body can be compensated for with accuracy.

It is noted that, as for the calculating section, there can be mentioned, a displacement sensor which directly measures the displacement of the feed device, such as a proximity sensor, various linear encoders and an optical sensor. When an acceleration sensor is used, the position of the feed device is indirectly calculated by the double integral of the obtained acceleration and then the displacement thereof is estimated from the difference between the obtained position and the original position thereof. In addition, the calculating section may indirectly measure the displacement of the feed device by measuring a partial displacement volume, which is the volume of displacement of a representative portion of the deformation of the structural body. As such a calculating section, there can be mentioned, for example, a strain gauge which detects the strain of the structural body, and, in this case, the displacement of the structural body, that is, the displacement of the feed device is estimated from the detected strain.

The calculating section may directly or indirectly measures at least one of a force applied to the moving body and acceleration of the moving body as well as acceleration of the structural body, calculates the displacement of the feed device in the feed-axis direction with respect to the reference position caused by the displacement of the structural body on the basis of the equation of motion of the structural body, and outputs the calculated displacement at predetermined time intervals.

In the above-described configuration, since, according to the principle of action and reaction, the strength of the force applied to the moving body is equal to the strength of a reaction force which is applied to the structural body when accelerating or decelerating the moving body, the latter may be measured instead of the former.

According to the above-described configuration, at least one of a force applied to the moving body and acceleration of the moving body as well as acceleration of the structural body are measured directly or indirectly, and the displacement of the feed device in the feed-axis direction with respect to the reference position caused by the displacement of the structural body is simply and easily and accurately calculated on the basis of the measured values and the equation of motion of the structural body.

That is, the displacement of the feed device in the feed-axis direction with respect to the reference position caused by the displacement of the structural body is calculated by only directly or indirectly measuring at least one of a force applied to the moving body and acceleration of the moving body as well as acceleration of the structural body. And, the calculated displacement is transmitted to the compensating section at predetermined time intervals. Thereby, it is possible to compensate for the displacement of the structural body with accuracy.

Further, the subject matter claimed herein solves the above-described problem by providing a machine tool having the positioning control apparatus and a tool or a workpiece is attached to the moving body.

According to the above configuration, it is possible to more accurately control a moving position of the moving body in the machine tool by the operation and effect of the positioning control apparatus and it is possible to achieve motion control in which the acceleration performance of the feed device is made the most of and to shorten the time to move the moving body.

As described above, according to the positioning control apparatus and the machine tool provided therewith, as compared with the conventional one, it is possible to perform positioning by a feed device with higher accuracy. Furthermore, it is possible to achieve motion control in which the acceleration performance of the feed device is made the most of and to shorten the time to move a moving body.

DESCRIPTION OF EMBODIMENTS

1, First Embodiment

Hereinafter, a first embodiment of the present disclosure will be described with reference to the drawings.

Figure 1:
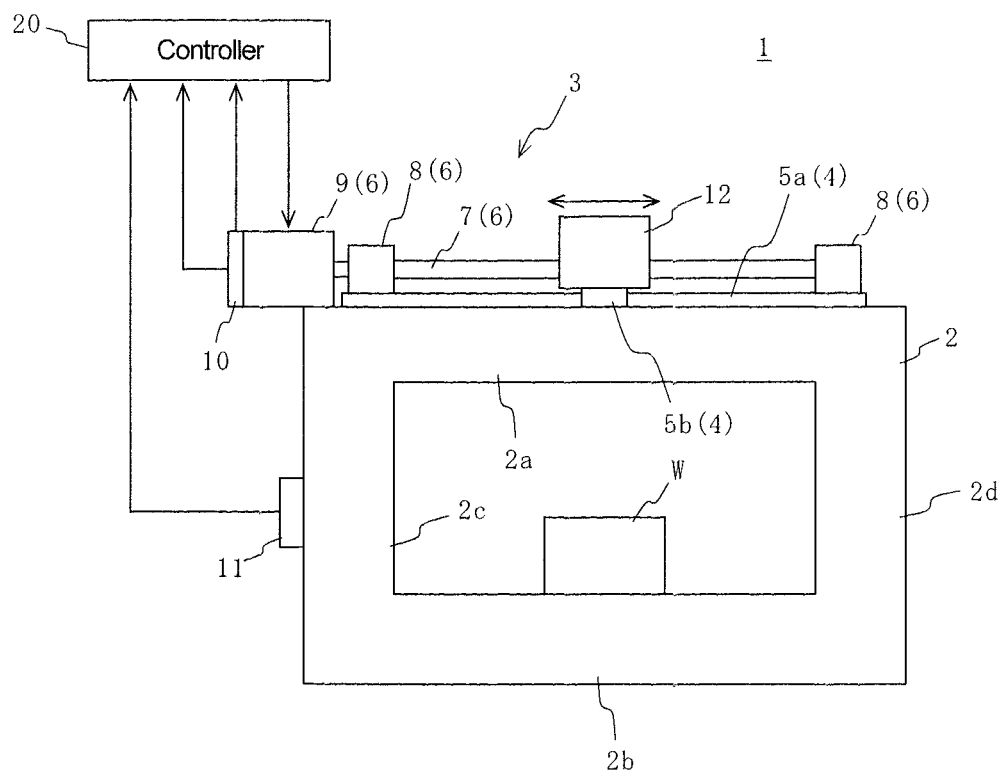
FIG. 1 is a schematic drawing showing a machine tool according to one embodiment of the present disclosure.
Figure 2:
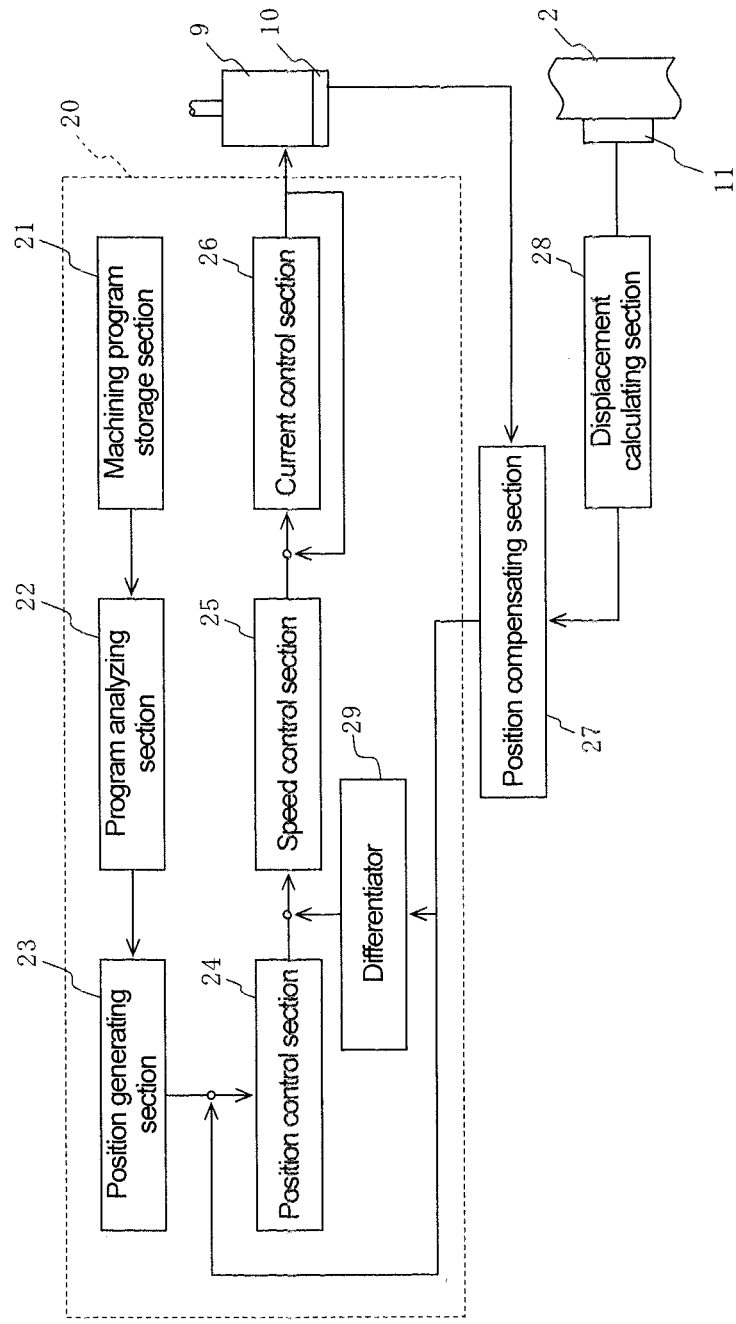
FIG. 2 is a schematic diagram showing a controller according to the embodiment.

As shown in FIGS. 1 and 2, a machine tool 1 of the embodiment comprises: a structural body 2 which has a rectangular shape with a central rectangular hollow portion in front view formed by an upper side portion 2a, a lower side portion 2b, a left vertical side portion 2c and a right vertical side portion 2d and on the upper surface of the lower side portion 2b of which a workpiece W is placed; a feed device 3 disposed on the upper surface of the upper side portion 2a of the structural body 2; a moving body 12 which is moved in the direction of a feed axis of the feed device 3 (the arrow direction in FIG. 1) by the feed device 3; a controller 20 for controlling the operation of the feed device 3; a displacement detector 11 which is provided on the outer side surface of the left vertical side portion 2c and which indirectly detects displacement of an upper end portion of the structural body 2 (that is, the upper side portion 2a) in the arrow direction (hereinafter, referred to as merely "the displacement"); a displacement calculating section 28 which calculates the volume of displacement of the feed device 3 on the basis of the data detected by the displacement detector 11; a position compensating section 27 which adds modification data for eliminating the displacement to a control signal of the controller 20 on the basis of the data calculated by the displacement calculating section 28; and a differentiator 29 which performs a differential process when inputting an output from the position compensating section 27 into a speed control section 25.

Figure 3:
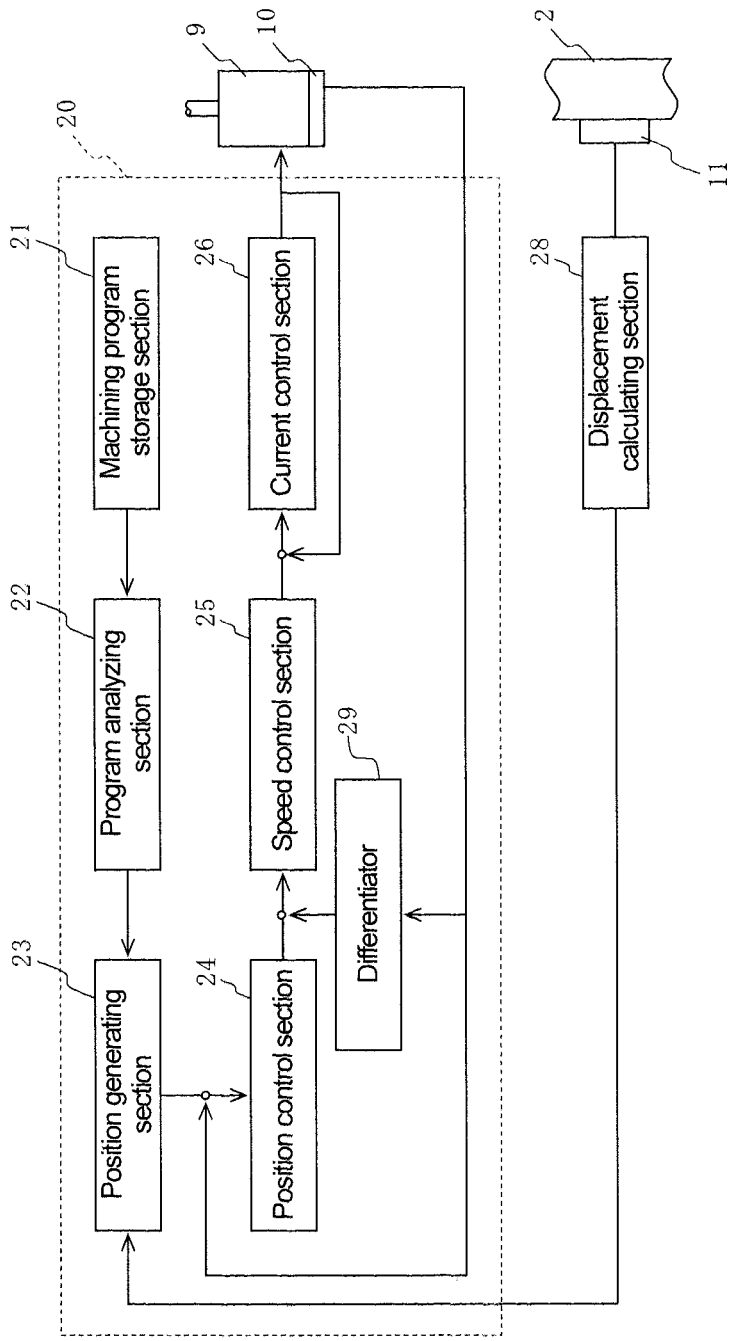
FIG. 3 is a schematic diagram showing another configuration of the controller.

It is noted that, although FIG. 2 explains a configuration including the position compensating section 27 in which modification data for eliminating the displacement is added to a control signal of the controller 20 on the basis of data from the displacement calculating section 28, instead of this configuration, as shown in FIG. 3, a configuration is possible in which modification data for eliminating the displacement is fed back to a position generating section 23 on the basis of data from the displacement calculating section 28 and added to a command value generated in the position generating section 23 to thereby perform position compensation.

Although FIG. 1 shows the machine tool 1 (positioning control apparatus) of the embodiment as a simple model and the embodiment assumes that a tool or a workpiece is attached to the moving body 12, a so-called tool spindle in which a tool is attached to the moving body 12 will be particularly descried as an example hereinafter. Further, in the embodiment, the displacement detector 11 and the displacement calculating section 28 form a calculating section.

The feed device 3 comprises a guide mechanism 4 supporting the moving body 12 so that the moving body 12 is movable in the arrow direction, and a drive mechanism 6 moving the moving body 12.

The guide mechanism 4 comprises two guide rails 5a which are disposed in parallel in the arrow direction on the upper surface of the upper side portion 2a of the structural body 2 and two sliders 5b which are engaged with the guide rails 5a, respectively, and which are moved while being guided by the guide rails 5a, and the guide mechanism 4 guides the movement of the moving body 12 placed and fixed on the sliders 5b in the arrow direction.

The drive mechanism 6 comprises a ball screw 7 disposed between the two guide rails 5a along them, support members 8 which are fixed on the upper surface of the upper side portion 2a and which support both ends of the ball screw 7 so that the ball screw 7 is rotatable, a drive motor 9 which is fixed on the upper surface of the upper side portion 2a and which rotates the ball screw 7 about its axis, a nut 13 which is screwed onto the ball screw 7 and which is fixed on the lower surface of the moving body 12, and a position detector 10 which detects the position of the moving body 12 in the arrow direction.

Figure 4:
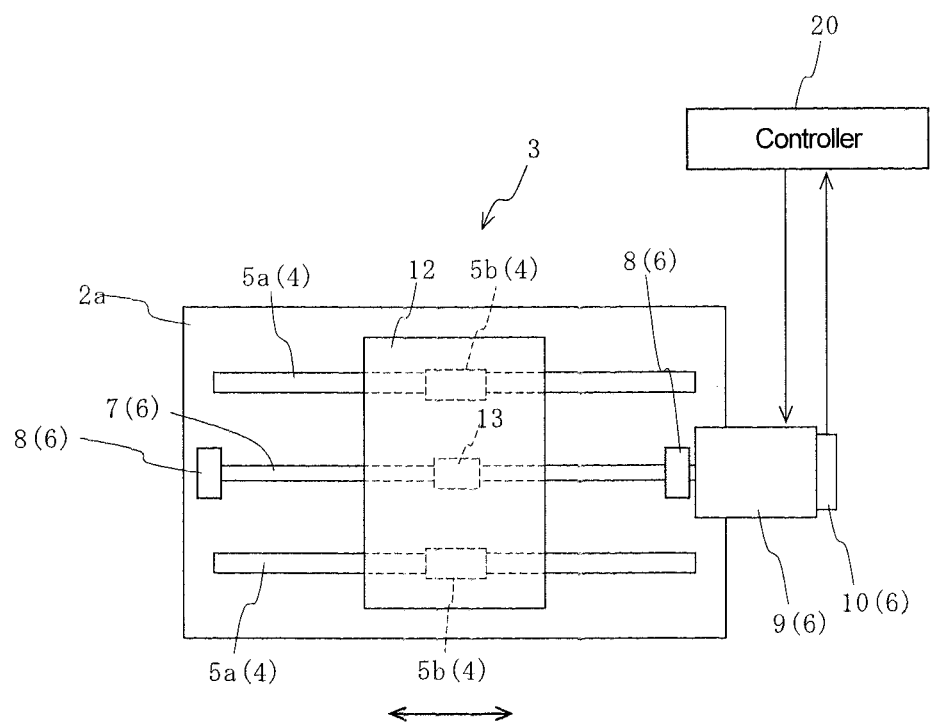
FIG. 4 is a schematic drawing showing the configuration of the feed device in FIG. 1 as seen from above.

FIG. 4 shows a structure of the feed device 3 comprising the guide mechanism 4 and drive mechanism 6 thus configured seen from above. In FIG. 4, the moving body 12 can be moved sliding in the direction of the arrow in the figure according to the rotation of the ball screw 7.

The position detector 10 comprises, for example, a rotary encoder attached to the drive motor 9, and transmits to the position compensating section 27, which will be described later, position data of the moving body 12 detected one after another, that is, at predetermined time intervals (sampling intervals), and adds speed data which is obtained by differentiating the detected position data to a speed command signal, which will be descried later, at the same sampling intervals.

It is noted that the means of detecting the position data is not limited to the above-mentioned rotary encoder, and may be, for example, a linear encoder which directly detects the position of the moving body 12.

The controller 20 comprises, as shown in FIG. 2, a machining program storage section 21, a program analyzing section 22, the position generating section 23, a position control section 24, the speed control section 25, a current control section 26, and the differentiator 29, and controls a moving position of the moving body 12 in the arrow direction.

The machining program storage section 21 is a functional section in which a pre-generated machining program is stored, and transmits the machining program stored therein to the program analyzing section 22.

The program analyzing section 22 analyzes the machining program received from the machining program storage section 21, extracts commands for the feed rate and the moving position of the feed device 3, and transmits the extracted commands or signals to the position generating section 23.

The position generating section 23 generates a signal (an operation command signal that is a control signal) for a target moving position of the feed device 3 at every time interval (at every predetermined time interval) on the basis of the commands or signals transmitted from the program analyzing section 22 taking a predetermined time constant into consideration, and transmits the generated signal to the position control section 24 one after another.

The position control section 24 generates a speed command signal on the basis of the deviation between the operation command signal transmitted from the position generating section 23 and the position data transmitted from the position compensating section 27 (that is, an operation command signal obtained by adding the position data (modification data) from the position compensating section 27 to the operation command signal from the position generating section 23), and transmits the generated speed command signal to the speed control section 25.

The speed control section 25 generates a current command signal on the basis of the deviation between the speed command signal transmitted from the position control section 24 and the actual speed data transmitted (fed back) from the position detector 10, and transmits the generated current command signal to the current control section 26.

The current control section 26 transmits to the drive motor 9 a drive current signal (drive command signal) based on the deviation between the current command signal transmitted from the speed control section 25 and the actual current signal fed back. The operation of the drive motor 9 is controlled according to this drive current signal.

The displacement detector 11 comprises a strain gauge. The displacement detector 11 detects strain of the left vertical side portion 2c of the structural body 2, which is caused by the movement of the moving body 12, at the sampling intervals, and transmits data on the detected strain to the displacement calculating section 28.

The displacement calculating section 28 calculates displacement of the upper side portion 2a of the structural body 2 on the basis of the strain data transmitted from the displacement detector 11, and transmits the calculated displacement data to the position compensating section 27. The method of calculating the displacement is not particularly limited thereto, and the displacement can be calculated from the strain data on the basis of the structural mechanical theory, for example. When the structural body 2 has a complicated shape, it is possible to define a relational expression based on a simulation using the finite element method or to define a relational expression based on experiment data.

Figure 5:
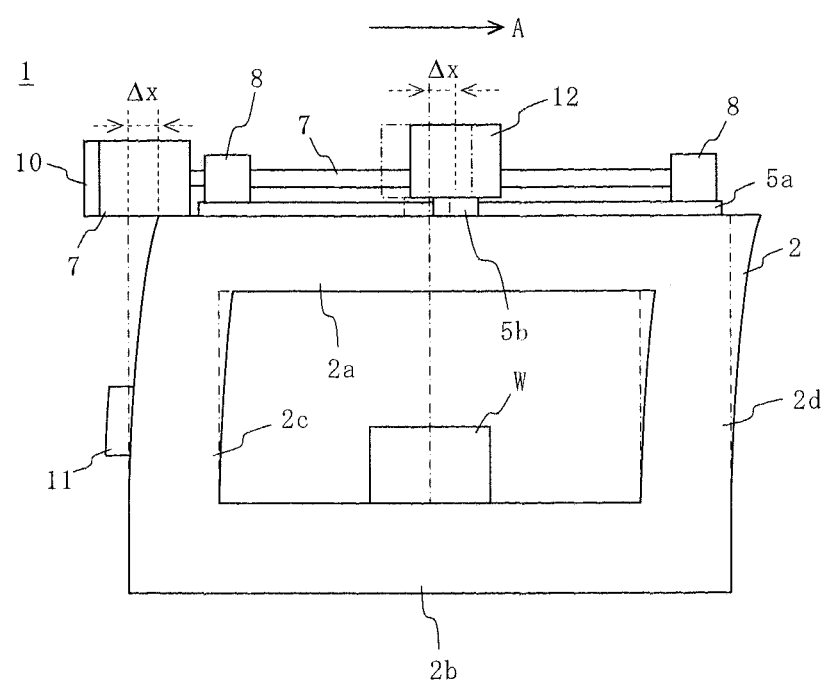
FIG. 5 is an illustration for explaining deformation caused on a structural body.

Further, the above-mentioned displacement means displacement of the upper side portion 2a with respect to the lower side portion 2b of the structural body 2. In the embodiment, since a workpiece W is placed on the lower side portion 2b and the feed device 3 is disposed on the upper side portion 2a, the displacement is considered as displacement of the feed device 3 in the arrow direction, using the workpiece W as a reference position. FIG. 5 shows, as an example, a case where the upper end of the structural body 2 is displaced by Δx in the direction of the arrow A, that is, it is displaced by Δx with respect to the reference position. According to FIG. 5, it can be seen that, due to the displacement Δx of the structural body 2 in the direction of the arrow A, the moving body 12 and the workpiece W has a position relationship in which the moving body 12 is shifted by Δx with respect to the workpiece W.

The position compensating section 27 adds the actual position data of the moving body 12 transmitted (fed back) from the position detector 10 and the displacement data of the structural body 2 (that is, the displacement data of the feed device 3) transmitted from the displacement calculating section 28 and thereby calculates modification data, and adds the calculated modification data to the operation command signal output from the position generating section 23.

In the machine tool 1 of the embodiment thus configured, first, a machining program stored in the machining program storage section 21 is read out by the program analyzing section 22 and commands for feed rate and for moving position are extracted from the machining program by the program analyzing section 22, and the extracted commands are transmitted to the position generating section 23.

Then, the position generating section 23 generates an operation command signal on the basis of the signals transmitted from the program analyzing section 22, and transmits the generated operation command signal to the position control section 24.

Thereafter, the position control section 24 generates a speed command signal on the basis of the received operation command signal and transmits the generated speed command signal to the speed control section 25, the speed control section 25 generates a current command signal on the basis of the received speed command signal and transmits the generated current command signal to the current control section 26, the current control section 26 generates a drive current signal (drive command signal) on the basis of the received current command signal and transmits the generated drive current signal to the drive motor 9, and the drive motor 9 is driven and controlled according to the drive current signal.

At this time, a speed tracking error is compensated for by current speed data fed back from the position detector 10 and a current tracking error is compensated for by feedback of an actual current signal.

Further, in the position compensating section 27, modification data is calculated by adding motor position data fed back from the position detector 10 and displacement data transmitted from the displacement calculating section 28, and the calculated modification data is added to the operation command signal output from the position generating section 23.

The deviation between the operation command signal output from the position generating section 23 and the motor position data fed back from the position detector 10 corresponds to a tracking error of the moving body 12 in the feed device 3. Further, the displacement data transmitted from the displacement calculating section 28 relates to the displacement of the whole feed device 3 in the arrow direction (the feed-axis direction) with respect to a reference position (in the embodiment, the position of the workpiece W). Therefore, the value obtained by adding the tracking error and the displacement is an error between a commanded position with respect to the reference position and the actual position.

Thus, the position compensating section 27 calculates an error between a commanded position with respect to a reference position and the actual position by adding an tracking error of the moving body 12 and displacement of the whole feed device 3 with respect to the reference position, and adds the calculated error data as modification data to the operation command signal output from the position generating section 23 to thereby eliminate the calculated error. The tracking error of the moving body 12 in the feed device 3 and the displacement of the whole feed device 3 with respect to the reference position are compensated for by the addition of the modification data.

As described above, the structural body 2 supporting the feed device 3 is actually not a perfectly rigid body, and the movement of the moving body 12 causes, on the structural body 2, a large deformation (displacement) being greatly above a positioning accuracy which has been required in recent years (for example, a few μm) unless the moving body 12 is moved with a reduced acceleration.

In the embodiment, the displacement of the structural body 2 (i.e., the feed device 3) in the feed-axis direction is measured and a position at which the moving body 12 is to be positioned is compensated for so that this displacement is eliminated. Therefore, it is possible to position the moving body 12 with respect to the reference position with much higher accuracy and it is therefore possible to achieve a more highly accurate machining Further, the configuration in which the displacement of the feed device 3 caused by the deformation of the structural body 2 is compensated for makes it unnecessary to perform control for, when moving the moving body 12, suppressing the acceleration to thereby suppress the deformation of the structural body 2, and it is therefore possible to achieve a motion control in which the acceleration performance of the feed device 3 is made the most of and to shorten the time to move the moving body 12.

Although the machine tool 1 of the embodiment has a configuration in which displacement of the upper end of the structural body 2, that is, displacement of a position very close to the feed device 3 is considered as displacement of the feed device 3 and is indirectly measured, the machine tool 1 may have a configuration in which, for example, displacement of a part of the feed device 3 (for example, the drive motor 9) is directly measured by a proximity sensor, an acceleration sensor or the like.

Further, although a strain gauge is given as an example of the displacement detector 11, the displacement detector 11 is not limited thereto, and an acceleration sensor, a proximity sensor, various linear encoders, an optical sensor or the like may be used instead. When using an acceleration sensor, the position of the structural body 12 can be calculated by a double integral of the obtained acceleration and further the displacement thereof can be estimated from the difference between the obtained position and the original position thereof.

Figure 6:
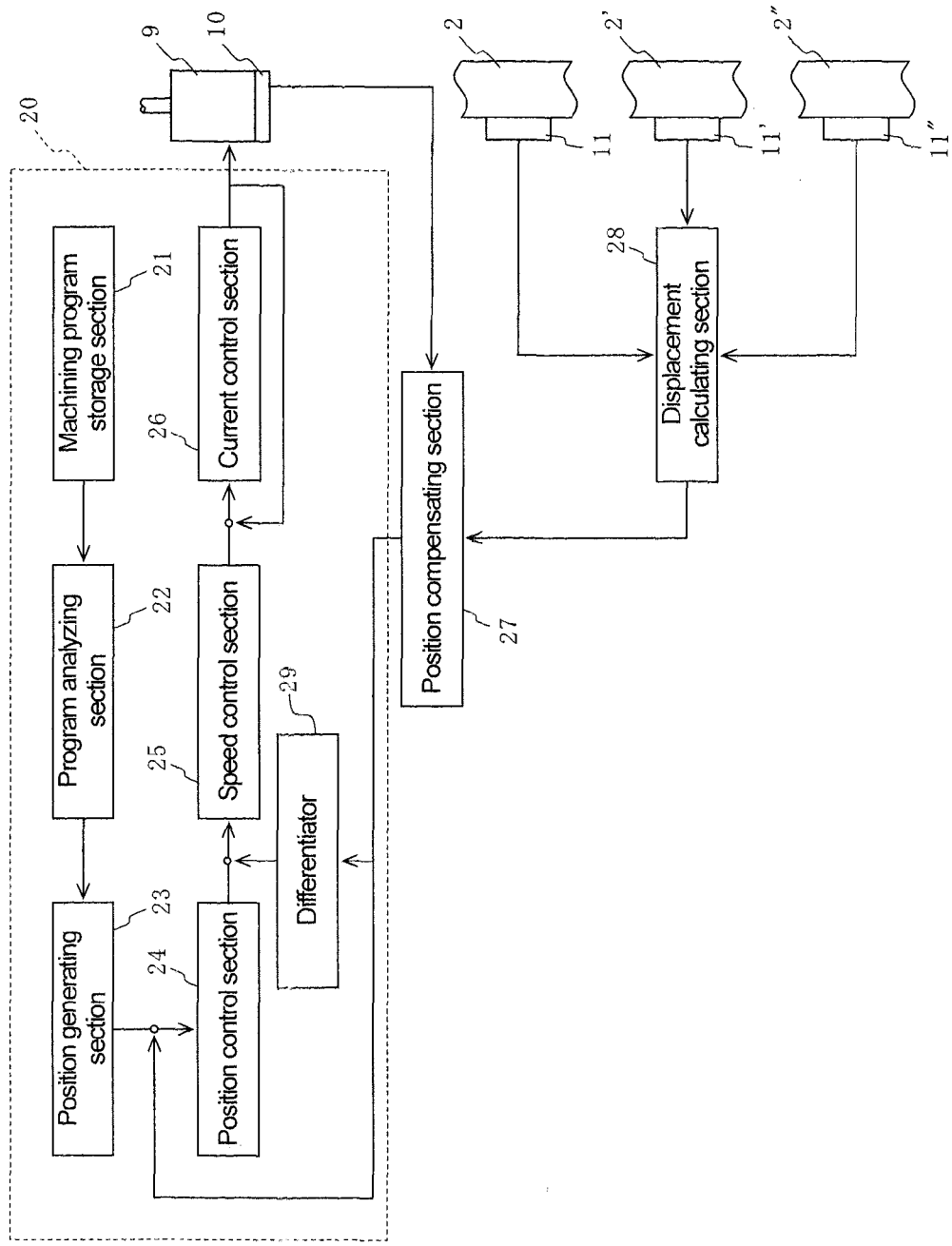
FIG. 6 is a schematic diagram showing a controller according to an alternative embodiment of the present disclosure.

Furthermore, in a case where, a plurality of structural bodies, for example, three structural bodies 2, 2', 2" cooperatively support the feed device 3 and the position of the feed device 3 in the feed-axis direction with respect to the reference position is changed by displacement of the structural bodies 2, 2', 2", it is advantageous that, as shown in FIG. 6, the displacement of the structural bodies 2, 2', 2" in the feed-axis direction are detected by displacement detectors 11, 11', 11", respectively, and the detected displacement data are transmitted to the displacement calculating section 28, and the displacement calculating section 28 puts the displacement of the structural bodies 2, 2', 2" together and calculates the displacement of the feed device 3 in the feed-axis direction on the basis thereof, and transmits the calculated displacement data to the position compensating section 27 to thereby compensate for the displacement of the feed device 3.

Figure 7:
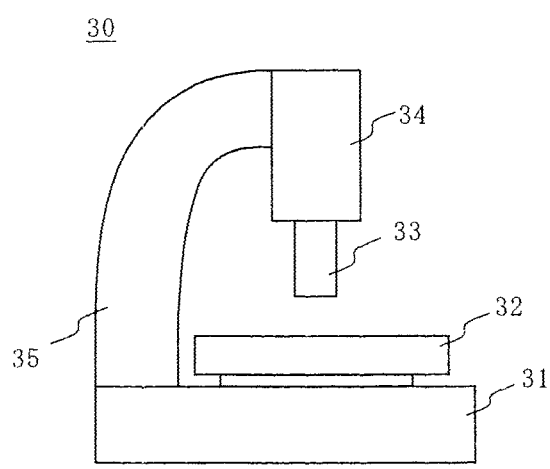
FIG. 7 is a schematic drawing showing a side view of the machine tool.

When thus configured, it is possible to accurately position the feed device 3 with respect to the reference position even when the feed device 3 is supported by a complicated support structure, and it is therefore possible to achieve a highly accurate machining FIG. 7 shows an example in which a displacement detector is provided on each of the tool side and the workpiece side in a machine tool 30. FIG. 7 schematically shows a side view of the machine tool 30. In FIG. 7, the machine tool 30 comprises a base 31, a workpiece supporting portion 32 supporting a workpiece, a spindle 33 to which a tool is attached, a drive motor 34 for driving the spindle 33, and a support arch 35, and a feed device, which is omitted in the figure, is provided on the workpiece supporting portion 32. In FIG. 7, a displacement detector may be provided at each of an optional position on the spindle 33, which is a representative position of the tool side, and an optional position on the workpiece supporting portion 32, which is a representative position of the workpiece side. When thus configured, relative displacement between the tool and the workpiece can be obtained by comparison of detection results obtained from the two displacement detectors. Although relative displacement can be caused between the tool and the workpiece by disturbance such as vibration due to motor driving, by providing a displacement detector on each of the tool and workpiece sides as described above and performing displacement compensation of the feed device using the obtained value of the relative displacement, it is possible to compensate for a motor command value in the feed device with accuracy even when such disturbance exists.

Further, in a machine tool having a plurality of feed devices, it is advantageous that, displacement of the feed devices in their respective feed-axis directions are each measured by a displacement detector to thereby compensate for the positions of moving bodies driven by the feed devices with respect to their respective reference positions.

Figure 8:
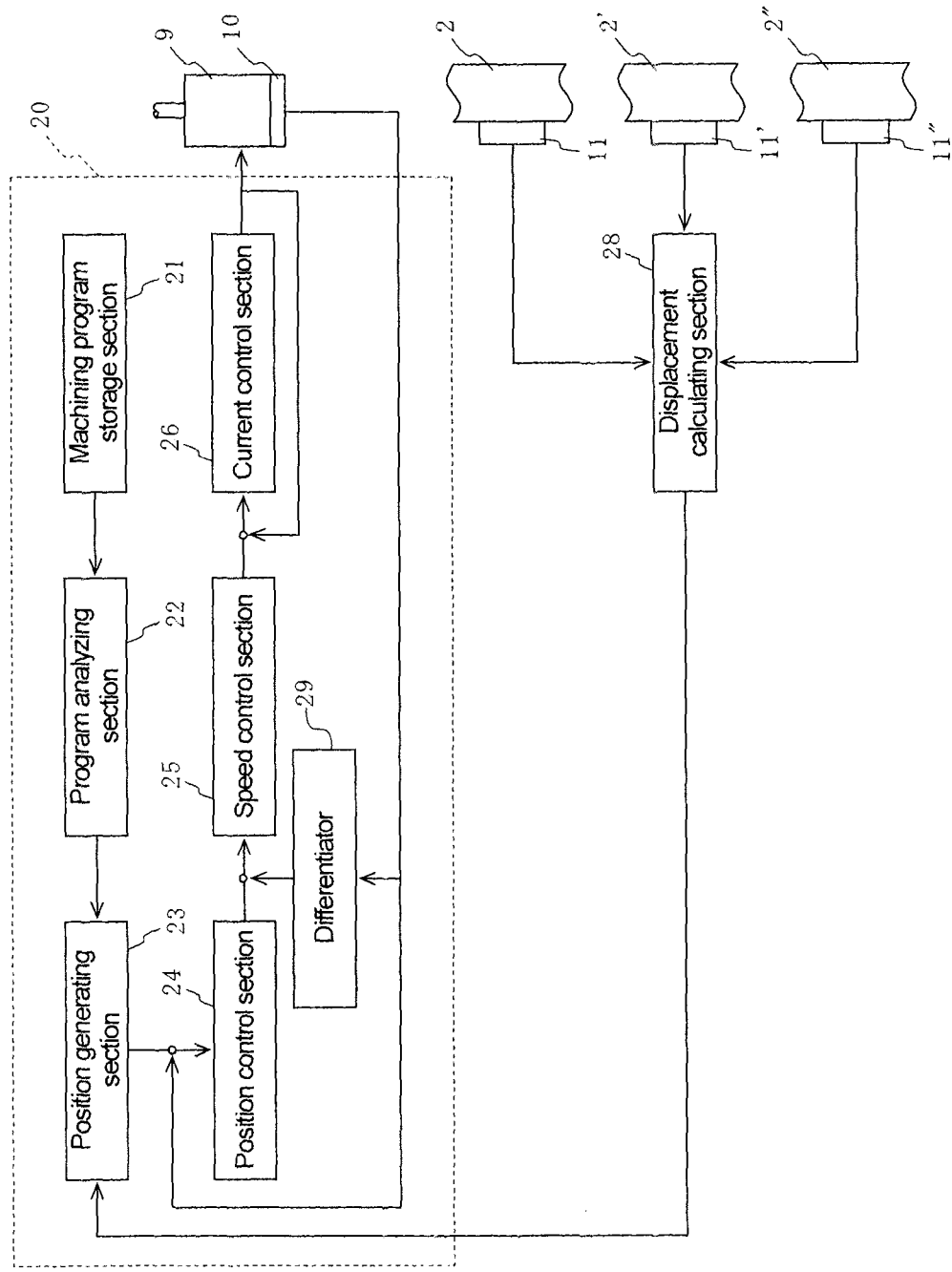
FIG. 8 is a schematic diagram showing the controller according to the alternative embodiment of the present disclosure.
Figure 9:
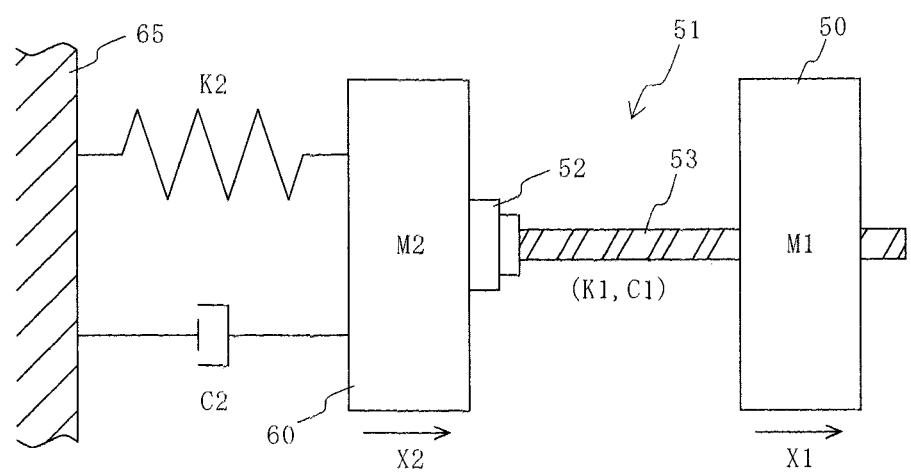
FIG. 9 is an illustration for explaining a conventional problem, in which a feed device and a structural body supporting the feed device are shown as a physical model.

Furthermore, as shown in FIG. 8, a configuration is possible in which the position data of the moving body 12 output from the position detector 10 is directly fed back to the operation command signal output from the position generating section 23 and the displacement data (modification data) output from the displacement calculating section 28 is added to the command value generated in the position generating section 23. In this case, in the position generating section 23, an operation command signal in which the displacement of the structural body 2 is compensated for is generated, and therefore a similar effect to the above can be obtained.

Further, although, in the above, the time interval for detecting strain in the displacement detector 11 is the same as the detection time interval in the position detector 10, it is not limited thereto and may be a shorter time interval or a longer time interval. When the time interval in the displacement detector 11 is shorter than that in the position detector 10, it is advantageous that an averaging process or the like is performed in the displacement calculating section 28 and displacement data thereby calculated is transmitted to the position compensating section 27. When it is longer, it is advantageous that an interpolating process or the like is performed in the displacement calculating section 28 and displacement data thereby calculated is transmitted to the position compensating section 27.

Furthermore, although, in the above, the position compensating section 27 and the displacement calculating section 28 are provided separately from the controller 20, they may be incorporated into the controller 20.

2, Second Embodiment

A configuration is possible in which the displacement calculating section 28 (calculating section) does not directly measure the displacement of the feed device 3 in the feed-axis direction with respect to the reference position caused by the displacement of the structural body 2 (the displacement detector 11 is not used), and at least one of a force applied to the moving body and acceleration of the moving body as well as acceleration of the structural body are measured and the displacement is calculated on the basis of the results of the measurement and the equation of motion of the structural body 2. Therefore, this configuration will be hereinafter described as a second embodiment of the present disclosure.

First, where a system of the structural body 2 including the feed device 3 is considered with the mass thereof represented by $M_2$ and the elastic constant thereof represented by K, the equation of motion of the structural body 2 is represented by an equation 6 ($x_2'$ represents the first order differential of displacement $x_2$ with respect to time and $x_2''$ represents the second order differential of the displacement $x_2$ with respect to time).

$$M_2 x_2'' + C x_2' + K x_2 = f \quad \text{(Equation 6)}$$

Here, since the displacement of the structural body 2 is, similarly to the first embodiment, displacement of the upper side portion 2a with respect to the lower side portion 2b of the structural body 2 and, in this embodiment, a workpiece W is placed on the lower side portion 2b and the feed device 3 is disposed on the upper side portion 2a, the displacement of the structural body 2 is considered as displacement of the feed device 3 in the arrow direction (see FIG. 1) using the workpiece W as a reference position.

In the equation 6, f represents a reaction force generated when a force of acceleration/deceleration for moving the moving body acts on the structural body, and C represents the coefficient of viscous damping. For simplification of the equation, when 0 is substituted for C in the equation 6, an equation 7 is obtained.

$$M_2 x_2'' + K x_2 = f \quad \text{(Equation 7)}$$

When solving the equation 7 for $x_2$, the following equation 8 is obtained.

$$X_2 = f/K - x_2''/\omega^2 \quad \text{(Equation 8)}$$

In the equation 8, $\omega = (K/M_2)^{1/2}$, and this is the natural angular frequency of the system.

Acceleration $x_2''$ of the structural body 2, the second member of the equation 8, can be easily measured by providing an acceleration sensor for the structural body 2 instead of providing the displacement detector 11 for the structural body 2. The displacement $x_2$ of the structural body 2 can be obtained by the second order integral of output of the acceleration sensor as descried above. However, since integral calculation causes a cumulative error, the displacement $x_2$ of the structural body 2 can be more accurately calculated when using the equation 8 in which output of the acceleration sensor is used as it is than when using integral calculation. It is noted that, since ω is the natural angular frequency, ω has a constant value and may be obtained by any method.

As for a specific method of obtaining the natural angular frequency ω, for example, it is possible to measure the natural angular frequency ω by causing the structural body 12 to freely vibrate by means of applying a force thereto in a state where the nut portion (the nut 13 in FIG. 4) fixing the moving body 12 is undone in the feed device 3 and the moving body 12 is thereby separated from the structural body 2.

As described above, the first member of the equation 8 is the volume of deformation generated by a reaction force generated when accelerating or decelerating the moving body 12. Because the reaction force when accelerating or decelerating the moving body 12 is the force applied to the moving body 12 for accelerating or decelerating the moving body 12 and is proportional to a torque value, that is, a drive current signal i, of the drive motor 9, the first member of the equation 8 is proportional to the drive current signal i of the drive motor 9.

Therefore, as long as only the constant of proportionality between them is determined in advance, it is possible to obtain a value of the first member of the equation 8 (the displacement of the structural body 2) from the drive current signal i of the drive motor 9.

As for a specific method of obtaining the above-mentioned constant of proportionality, for example, it is possible to obtain the constant of proportionality by accelerating the moving body 12 with a constant acceleration (a constant torque, that is, a constant drive current signal), measuring the then actual displacement $x_2$ of the structural body 2 and removing a vibration component of the second member by an averaging process.

Thus, obtaining the natural angular frequency ω of the structural body 2 and the proportionality relationship with the drive current signal i of the drive motor 9 in advance makes it possible to simply and easily calculate the displacement $x_2$ of the structural body 2 on the basis of the values of the acceleration sensor of the structural body 2 and the drive current signal i.

It is noted that, although, in the above, the drive current signal i of the drive motor 9 is used for obtaining f of the equation 8, it is possible to measure a force f which the structural body 2 receives by another method.

For example, as another method of obtaining a value of f, there is a method in which a value of f is obtained by attaching an acceleration sensor on the moving body 12 and multiplying output $x_1''$ of the acceleration sensor by the mass $M_1$ of the moving body 12 on the basis of the relationship of $f=M_1 \times x_1''$. $M_1$ may be actually measured or be measured as the constant of proportionality between $x_1''$ and f by an experiment similarly to the above. Further, where an actual measurement is not used, it is possible to calculate a value of K by the CAE analysis. Furthermore, since, as described above, $\omega=(K/M_2)^{1/2}$ corresponds to the value of the natural angular frequency of the system, it can be obtained by an actual measurement of the frequency of the residual vibration after stop or by the CAE analysis.

However, when actually measuring the frequency of the residual vibration after stop, in a conventional measurement in a control system in which the vibration of the structural body is not taken into consideration, the value of $\omega$ is measured to be lower. The compensation of the displacement of the structural body 2 ideally causes a state where the moving body never vibrates. That is, at the time of residual vibration, the compensation of the displacement of the structural body 2 causes a state where the moving body is not moved and residual vibration occurs on only the structural body 2. As for the vibration of the structural body 2 in this case, the natural angular frequency $\omega$ is higher because the mass of the moving body does not concern the vibration of the structural body 2. The reason therefor is that, as described above, where the mass of the moving body is $M_1$ and the equivalent mass of the structural body 2 contributing to the vibration is $M_2$, since $M_2$ is replaced by $M=M_1+M_2$ in $\omega=(K/M_2)^{1/2}$, in the conventional control system in which the vibration of the structural body is not taken into consideration, the measurement is performed as $\omega=(K/M)^{1/2}$ and the value of $\omega$ is measured to be lower.

Therefore, in order to accurately calculate the displacement $x_2$ of the structural body 2, which is to be used for the compensation, using the residual vibration after stop, it is necessary to use the natural angular frequency $\omega$ which is higher as described above reason instead of using $\omega$ which is obtained by the above-mentioned actual measurement of residual vibration.

In a case where the subject matter disclosed herein is applied to a machine tool, when a workpiece is also supported by the structural body 2 (a tool is attached to the moving body and a workpiece is appropriately mounted to the structural body), since the workpiece also vibrates together with the lower portion of the structural body 2, the compensation volume to be added to the position of the moving body may be smaller than the value of the displacement $x_2$ obtained by the equation 8 (for example, the compensation volume may be about 30% of the displacement $x_2$). As for what percentage of the displacement $x_2$ is to be the compensation volume, it can be optimized by measuring the ratio of the amplitude of the workpiece to the amplitude of the structural body 2 at the time of residual vibration.

As described above, in the embodiment, the displacement calculating section 28 (calculating section) does not use the displacement detector 11 and measures at least one of a force applied to the moving body and acceleration of the moving body as well as acceleration of the structural body, and calculates the displacement of the structural body 2 on the basis of the results of the measurement and the equation of motion of the structural body 2, thereby compensating for a position error of the moving body 12 with this displacement.

A specific compensation method is similar to that of the first embodiment. A method is possible in which modification data for eliminating the displacement is added to the control signal of the controller 20 on the basis of data from the displacement calculating section 28, thereby performing position compensation (see FIG. 2). Alternatively, a method is possible in which modification data for eliminating the displacement is fed back to the position generating section 23 on the basis of data from the displacement calculating section 28 and is added to the command value generated in the position generating section 23, thereby performing position compensation (see FIG. 3).

Thus, the first and second embodiments of the present disclosure have been described. However, a specific embodiment in which the present disclosure can be implemented is not limited thereto.

INDUSTRIAL APPLICABILITY

As described above, the present disclosure may be applied to a machine in which a highly accurate positioning control is required, such as a machine tool, a mounter and the like.

What is claimed is:
1. A positioning control apparatus comprising:
a moving body;
a feed device having a guide mechanism for guiding the moving body in a predetermined feed-axis direction and a drive mechanism for moving the moving body;
a structural body supporting the feed device; and
a controller for controlling a moving position of the moving body with respect to a predetermined reference position by controlling an operation of the drive mechanism;
wherein the positioning control apparatus has:
a calculating section which calculates a displacement amount of the feed device in the feed-axis direction with respect to the reference position caused by displacement of the structural body, the displacement of the structural body occurring due to a reaction force which is against a force applied to the moving body when the moving body is moved by the feed device and which acts on the structural body through the feed device, and
a compensating section which receives the displacement amount calculated by the calculating section and adds a modification amount for eliminating the displacement amount to a control signal for controlling the drive mechanism in the controller; and
the calculating section calculates the displacement amount x of the feed device in the feed-axis direction with respect to the reference position caused by displacement of the structural body using a following equation:

$$x=f/K-x''/\omega^2,$$

where f is the force acting on the structural body and is also the reaction force against the force applied to the moving body, K is an elastic coefficient of the structural body, $\omega$ is a natural angular frequency of the structural body, and $x''$ is acceleration of the moving body.

2. A machine tool having the positioning control apparatus according to claim 1, wherein a tool or a workpiece is attached to the moving body.

* * * * *